US 12,015,549 B2

(12) United States Patent
Frasier et al.

(10) Patent No.: US 12,015,549 B2
(45) Date of Patent: Jun. 18, 2024

(54) IMMEDIATE TERMINATION OF POLICY FUNCTIONS

(71) Applicant: Arista Networks, Inc., Santa Clara, CA (US)

(72) Inventors: Oscar Harry Frasier, Manchester, NH (US); David Cronin, Dublin (IE); Keon Matthew Vafai, Milpitas, CA (US); Matthieu Loriol, Vancouver (CA); Sharad Birmiwal, Burnaby (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 118 days.

(21) Appl. No.: 18/049,394

(22) Filed: Oct. 25, 2022

(65) Prior Publication Data
US 2024/0039840 A1 Feb. 1, 2024

Related U.S. Application Data

(60) Provisional application No. 63/392,839, filed on Jul. 27, 2022.

(51) Int. Cl.
*H04L 45/42* (2022.01)
*H04L 45/03* (2022.01)
*H04L 45/74* (2022.01)

(52) U.S. Cl.
CPC ............. *H04L 45/42* (2013.01); *H04L 45/03* (2022.05); *H04L 45/74* (2013.01)

(58) Field of Classification Search
CPC .......... H04L 45/74; H04L 45/03; H04L 45/42
USPC ....................................................... 709/238
See application file for complete search history.

(56) References Cited

U.S. PATENT DOCUMENTS

| | | | | |
|---|---|---|---|---|
| 8,750,144 | B1 * | 6/2014 | Zhou | H04L 45/54 |
| | | | | 709/224 |
| 2008/0285560 | A1 * | 11/2008 | Curtis | H04L 45/122 |
| | | | | 370/392 |
| 2018/0109450 | A1 * | 4/2018 | Filsfils | H04L 45/04 |
| 2023/0038824 | A1 | 2/2023 | Mahadevan et al. | |

FOREIGN PATENT DOCUMENTS

EP 2296407 A1 * 3/2011 ............. H04L 45/42

OTHER PUBLICATIONS

Dynamic update of aggregated routing information for hierarchical QoS routing in ATM networks Ben-Jye Chang; Ren-Hung Hwang Proceedings. Eighth International Conference on Parallel and Distributed Systems. ICPADS 2001 (Year: 2001).*

* cited by examiner

*Primary Examiner* — Lan Dai T Truong
(74) *Attorney, Agent, or Firm* — Fountainhead Law Group, P.C.

(57) ABSTRACT

A routing policy includes policy directives and policy functions. Execution of the routing policy includes invoking a policy function at a point of application in a policy directive. Execution of the invoked policy function can include making any number of nested function calls. When an EXIT statement is encountered in a nested policy function, execution of the policy function terminates and execution of the routing policy continues immediately with the policy directive following the point of application, irrespective of how deeply nested in the invocation hierarchy the policy function is.

20 Claims, 7 Drawing Sheets

IMMEDIATE TERMINATION OF POLICY FUNCTIONS

CROSS REFERENCE TO RELATED APPLICATIONS

Pursuant to 35 U.S.C. § 119(e), this application is entitled to and claims the benefit of the filing date of U.S. Provisional App. No. 63/392,839 filed Jul. 27, 2022, the content of which is incorporated herein by reference in its entirety for all purposes.

The present disclosure relates to commonly owned U.S. application Ser. No. 17/392,519, entitled "Efficient Runtime Evaluation Representation, External Construct Late-binding, and Updating Mechanisms For Routing Policies," filed Aug. 3, 2021, and is incorporated herein by reference in its entirety for all purposes.

BACKGROUND

Routing policies in a network device (e.g., switch, router, etc.) can specify which and how routes are programmed into the routing tables and how routes are advertised. Users can create routing policies with technologies such as route-maps and RCFs (Routing Control Functions) to implement granular network controls. RCF is a tool that allows the user to define policy functions to evaluate routes. Policy functions can be complex and become a bottleneck for processing incoming control plane traffic, for example, BGP (border gateway protocol) routes. For example, in a deeply nested function call, the user may know the desired result of an evaluation within their policy when some condition is met, but have no convenient way of immediately terminating the evaluation to improve the performance in programming routing tables. Writing policy functions that terminate immediately from a deeply nested function call can become verbose; doing so can involve wrapping each function call with checks to optionally return when the condition is met.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
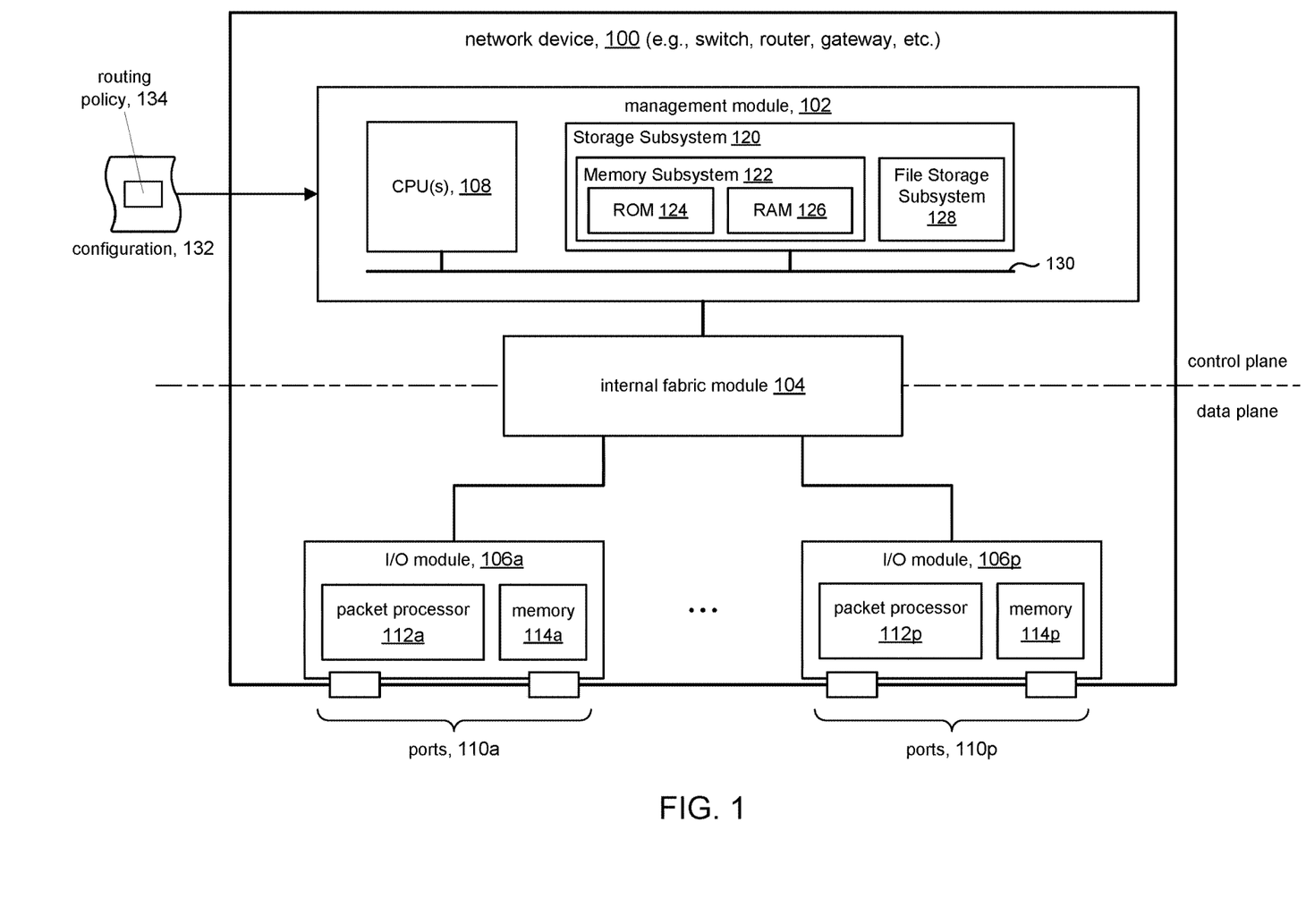
FIG. 1 is a high level representation of a network device in accordance with some embodiments.

FIG. 1 is a schematic representation of a network device (e.g., switch, router, etc.) that can be adapted in accordance with the present disclosure. In some embodiments, network device 100 can include a management module 102, an internal fabric module 104, and a number of I/O modules 106a-106p. Management module 102 can constitute the control plane (also referred to as control layer or simply the CPU) of network device 100 and can include one or more management CPUs 108 for managing and controlling operation of network device 100 in accordance with the present disclosure. Each management CPU 108 can be a general-purpose processor, such as an Intel®/AMD® x86, ARM® microprocessor and the like, that operates under the control of software stored in a memory, such as ROM (read-only memory) 124 or RAM (random-access memory) 126. The control plane provides services that include traffic management functions such as routing, security, load balancing, analysis, and the like.

Management module 102 includes one or more management CPUs 108 that communicate with storage subsystem 120 via bus subsystem 130. Other subsystems, such as a network interface subsystem (not shown in FIG. 1), may be on bus subsystem 130. Storage subsystem 120 can include memory subsystem 122 and non-volatile storage subsystem 128. Storage subsystem 120 represents an example of non-transitory computer-readable storage media that can store program code and/or data, which when executed by one or more management CPUs 108, can cause one or more management CPUs 108 to perform operations in accordance with embodiments of the present disclosure.

Memory subsystem 122 can include a number of memories including main RAM 126 for storage of instructions and data during program execution and ROM (read-only memory) 124 in which fixed instructions and data are stored. Storage subsystem 128 can provide persistent (i.e., non-volatile) storage for program and data files, and can include various types of storage media known in the art such as solid-state drives, hard-disk drives, and so on.

One or more management CPUs 108 can run a network operating system stored in storage subsystem 120. A network operating system is a specialized operating system for network device 100 (e.g., a router, switch, firewall, and the like). For example, the network operating system may be Arista Extensible Operating System (EOS®), which is a fully programmable and highly modular, Linux-based network operating system. Other network operating systems may be used.

Bus subsystem 130 can provide a mechanism for letting the various components and subsystems of management module 102 communicate with each other as intended. Although bus subsystem 130 is shown schematically as a single bus, alternative embodiments of the bus subsystem can utilize multiple busses.

Internal fabric module 104 and I/O modules 106a-106p collectively represent the data plane of network device 100 (also referred to as data layer, forwarding plane, etc.). Internal fabric module 104 represents interconnections among the various other modules of network device 100. Each I/O module 106a-106p can include one or more input/output (ingress/egress) ports 110a-110p that are used by network device 100 to receive and forward network traffic. Each I/O module 106a-106p can also include packet processing capability, logically represented by respective packet processors 112a-112p and memory components 114a-114p. Packet processors 112a-112p can comprise forwarding hardware, including for example, data processing elements such as an ASIC (application specific integrated circuit), FPGA (field programmable array), digital processing unit, and the like. Memory components 114a-114p can include lookup hardware, including for example, content addressable memory such as TCAMs (ternary CAMs) and auxiliary memory such as SRAMs (static random access memory). The forwarding hardware in conjunction with the lookup hardware can provide wire speed decisions on how to process ingress packets and outgoing packets for egress. In accordance with some embodiments, some aspects of the present disclosure may be performed within the data plane.

Configuration 132 can be provided to network device 100 to configure various aspects of the network device; e.g., which users can log into the device, DNS (directory name server) configuration, protocol configuration, hardware configuration. In some embodiments, configuration 132 can include routing policy 134 which represents an organization's policy how routes are to be treated in a given organization within which the network device is deployed; e.g., determine egress interface, VLAN tag manipulation, VxLAN encapsulation, etc.

Figure 2:
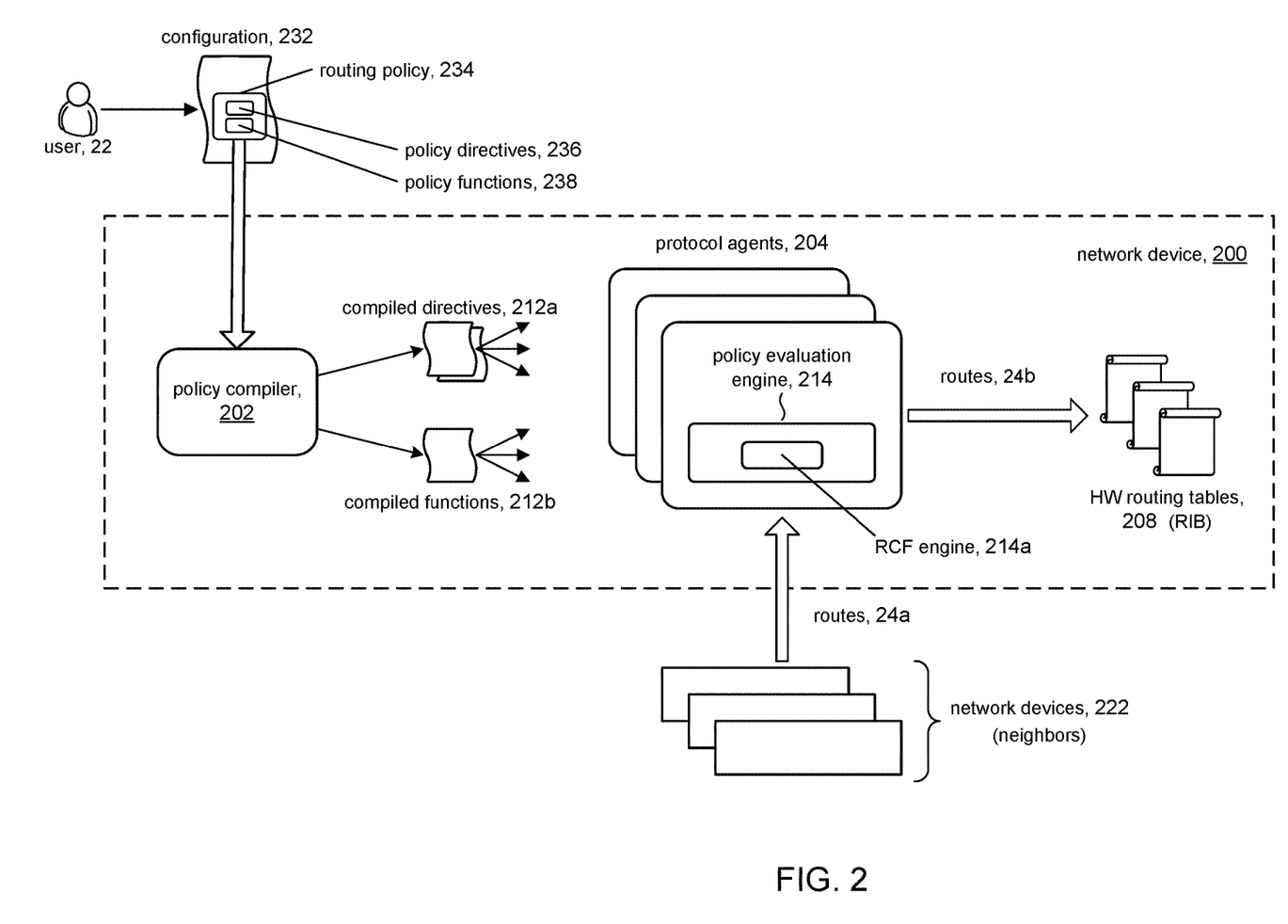
FIG. 2 illustrates policy processing elements in a network device in accordance with some embodiments.

FIG. 2 is a generalized schematic representation of a workflow in a network device for processing routes in accordance with the present disclosure. In some embodiments, for example, network device 200 can include policy compiler 202 to process a routing policy; e.g., routing policy 234 contained in configuration file 232 which, for example, can be provided by a user 22, a centralized network controller, etc. Policy compiler 202 can include one or more components to compile or otherwise translate the user-readable text that constitutes routing policy 234. Routing policy 234 can include policy directives 236 and policy functions 238, as shown for example in FIG. 3. In some embodiments, policy compiler 202 can include a translator to produce a suitable internal representation of policy directives 236 which is generically represented in FIG. 2 as compiled directives 212a.

In accordance with some embodiments, policy functions 238 can be written in a language called Routing Control Functions (RCF) developed and sold/licensed by Arista Networks, Inc. of Santa Clara, California. Users (e.g., network or system administrators) can write policy functions that express and evaluate policies such as route filtering and attribute modification in a programmatic fashion to facilitate processing of routes. Redundant multi-line policy directives in the routing policy, for example, can be defined as discrete functions referred to as policy functions to improve readability, support, and maintenance. Policy functions can perform certain common actions such as setting routes, VLAN tagging (virtual local area network), and so on. Policy compiler 202 can include a compiler to produce a suitable internal representation of policy functions 238, represented in FIG. 2 as compiled functions 212b.

Network device 200 can include protocol agents 204 (e.g., spanning tree protocol, address resolution protocol, boundary gateway protocol, etc.) that communicate with other network devices (neighbors, peers, etc.) 222 to exchange (receive, advertise) routes 24a. Protocol agents 204 can use the various compiled directives 212a and compiled functions 212b to evaluate received routes 24a in accordance with the routing policy 234 and output routes 24b to be stored in hardware routing tables 208 (e.g., routing information base, RIB) of the network device 200. In some embodiments, hardware routing tables 208 can comprise TCAMs, SRAMs, etc.

Each policy agent 204 can include a policy evaluation engine 214. During processing of a received route 24a, the policy evaluation engine 214 can use one or more of the compiled directives 212a and compiled functions 212b to determine how to program the received route. Policy evaluation engine 214 can create or otherwise represent an execution environment within which to execute the compiled directives and compiled functions.

In accordance with some embodiments, for example, the policy evaluation engine 214 can include an RCF engine 214a that creates or otherwise represents an RCF execution environment for executing compiled functions 212b. The nature of the RCF execution environment depends on the nature of the RCF language that is used to write policy functions. In some embodiments, for example, RCF can be an interpreted language, not unlike the BASIC programming language, and RCF engine 214a can be an interpreter that interprets human-readable RCF policy functions directly without compiling the functions. In some embodiments, RCF can be a partially compiled language. For example, policy functions can be compiled into an intermediate representation (e.g., bytecode) and RCF engine 214a can be an interpreter that interprets the intermediate representation. In some embodiments, RCF can be compiled into binary code and RCF engine 214a can be a virtual machine that executes the binary code.

Figure 3:
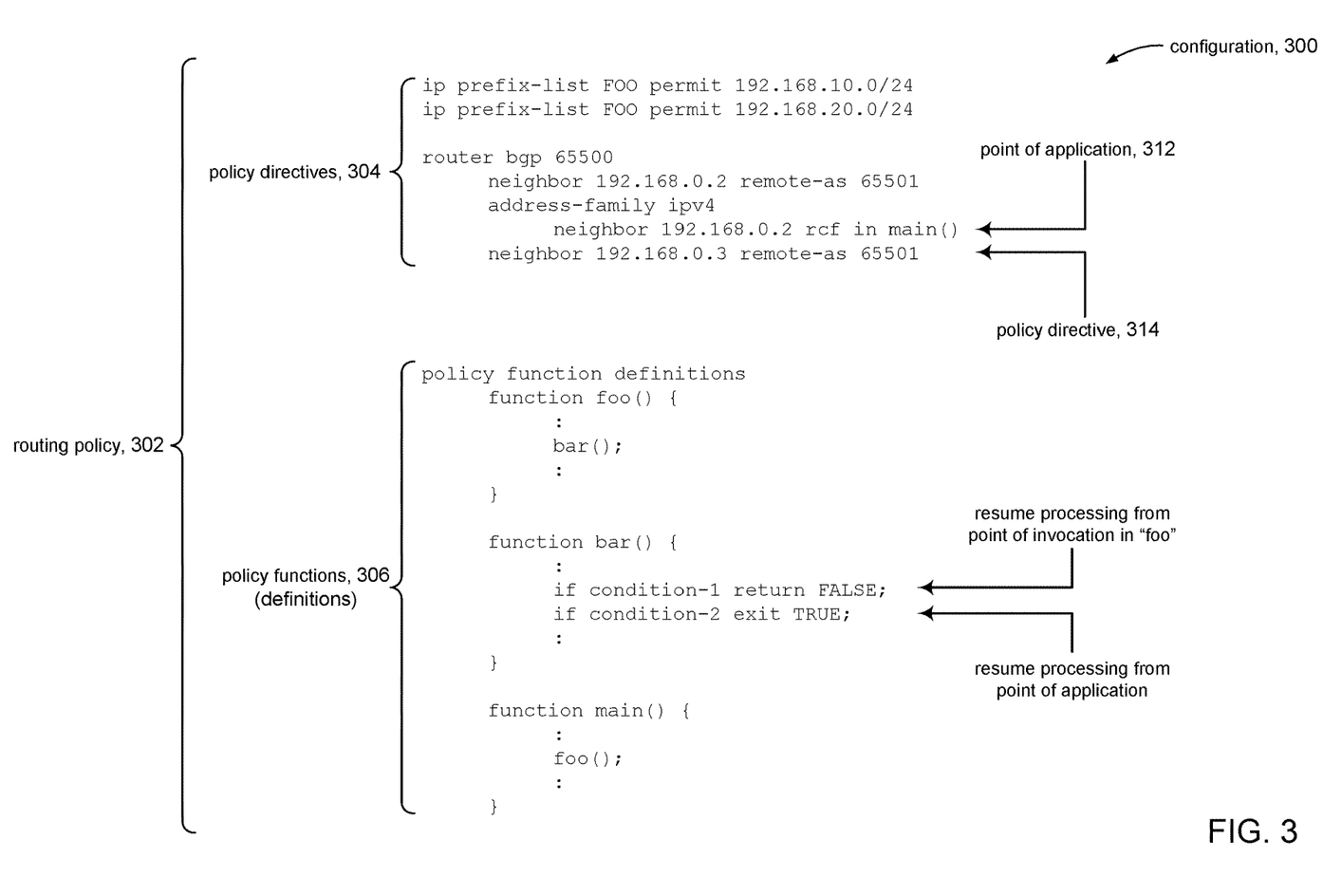
FIG. 3 is an illustrative example of a policy configuration.

FIG. 3 shows a snippet of a configuration 300 that contains a simplified example of a routing policy 302. A routing policy comprises policy directives 304. As can be seen in FIG. 3, the example routing policy 302 includes a policy directive that invokes a policy function called MAIN( ); the invocation of the policy function can be referred to as the "point of application" 312. Routing policy 302 can include a policy function definition section 306 comprising policy functions, including a definition of policy function MAIN( ), defined in accordance with the present disclosure.

When the policy function MAIN( ) is encountered at the point of application 312 during execution (evaluation) of routing policy 302, the function is invoked and processing of the routing policy continues within the policy function including making invocations of additional policy functions. When execution of MAIN( ) completes, processing of the routing policy continues with policy directive 314 which follows the point of application 312.

In accordance with the present disclosure, the RCF programming language can include a program control flow statement called EXIT. The EXIT statement is a programming construct that allows a policy function to immediately return processing to the point of application irrespective of how deeply nested the function call is. The EXIT statement avoids the user (e.g., network administrator) having to include boilerplate code in the policy functions to unwind from nested function calls. Instead, the EXIT statement embeds this behavior in the language itself. In some embodiments, the syntax of the EXIT statement can be:

EXIT <EXPRESSION>;
where EXPRESSION is a return value associated with the EXIT statement and can be:
    TRI-STATE value (e.g., TRUE, FALSE, UNKNOWN)
    logical expression that evaluates to a TRI-STATE value
    a function call that returns a TRI-STATE value The TRI-STATE value can be provided at the point of application 312 and can be used to inform further processing of the routing policy. In the example shown in FIG. 3, the return value provided at the point of application can determine whether to accept the route under evaluation from the BGP neighbor.

Operation of the EXIT statement contrasts with the RETURN statement which is a program control flow statement that is commonly used in programming languages. Whereas the RETURN statement in a function returns control flow to the immediate invoking function, the EXIT statement returns control flow immediately back to the point of application in the routing policy irrespective of how many nested function calls have been made. Consider, for example, the execution/evaluation of routing policy 302. When the policy engine reaches the point of application 312 in the routing policy, the RCF engine in the policy engine can invoke the policy function MAIN( ). As can be seen in the example, the RCF engine will reach the policy function BAR( ) by way of the following invocation hierarchy: MAIN( )→FOO( )→BAR( ).

If "condition-1" in function BAR( ) holds, the RETURN statement will cause the RCF engine to transfer execution back to the invoking function FOO( ) and continue with execution of program instructions (code) following the call to BAR( ). Upon completion of FOO( ), execution will transfer back to the invoking function MAIN( ) and continue with execution of code following the call to FOO( ). Upon completion of MAIN( ), execution will transfer back to the point of application 312 and continue with execution of the policy directive 314 that follows the point of application. It is noted that the return value of FALSE in function BAR( ) is available only to function FOO( ). It can be seen that in order for the return value to be available at the point of application, code is needed in function FOO( ) and function MAIN( ) to relay the return value back to the point of application.

Returning to function BAR( ), if on the other hand, "condition-1" does not hold but "condition-2" holds, the EXIT statement will cause the RCF engine to immediately transfer execution back to the point of application 312 and processing of the routing policy will continue with policy directive 314. Function FOO( ) which invoked BAR( ) and function MAIN( ) which invoked FOO( ) will be bypassed. More specifically, none of the code in FOO( ) following the invocation of BAR( ) will be executed, and likewise none of the code in MAIN( ) following the invocation of FOO( ) will be executed. In accordance with the present disclosure, the return value of TRUE in function BAR( ) can be made available at the point of application 312 despite the invoking functions MAIN( ) and FOO( ) having been bypassed.

Figure 4:
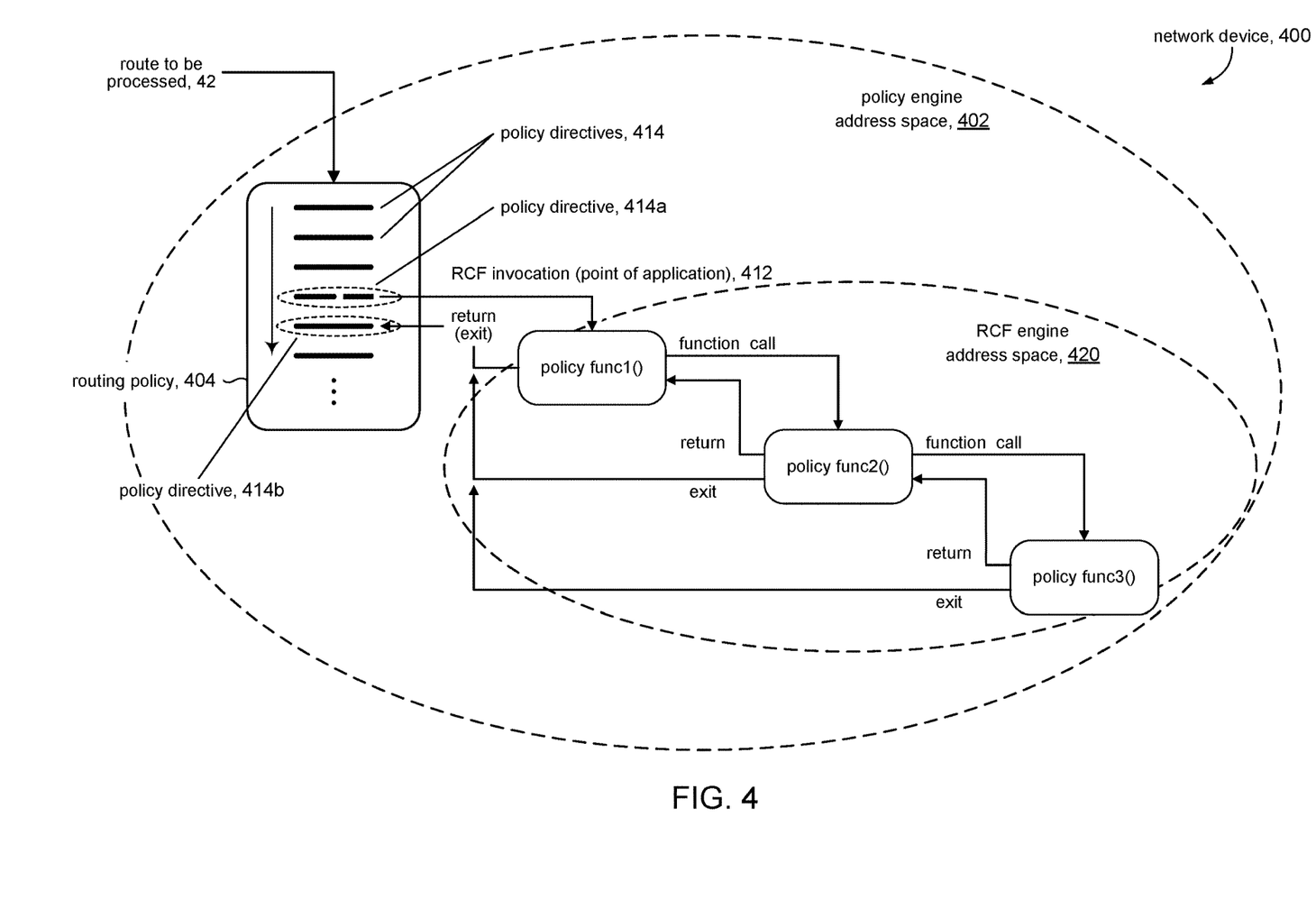
FIG. 4 represents an invocation flow in accordance with some embodiments.

FIG. 4 is a graphical representation of the invocation flow in a routing policy in accordance with the present disclosure. FIG. 4 shows route 42 being provided to routing policy 404. The route can come from a protocol agent (e.g., 204) executing on a network device 400, the route can be manually input by a user, and so on. Routing policy 404 comprises policy directives 414 which can be executed by a policy engine (e.g., 214) to evaluate route 42 processing; e.g., program the route, drop the route, compute tags, etc. FIG. 4 shows for discussion purposes a policy directive 414a that includes a point of application 412 to policy function FUNC1( ).

As noted above, the policy engine can be a process that executes on the network device. FIG. 4 shows that routing policy 404 executes in address space 402 of the policy engine process. When execution of the routing policy reaches policy directive 414a, execution of the routing policy continues with the policy function specified at the point of application 412. In some embodiments, for example, the policy engine can execute the policy function within a suitable RCF execution environment (e.g., RCF engine 214a). More specifically, in some embodiments, the RCF execution environment can exist within the address space 402 of the policy engine. The policy function, in turn, can execute in an address space 420 of the RCF execution environment.

In the illustrative example shown in FIG. 4, the policy function FUNC1( ) can be invoked at the point of application 412. Execution of FUNC1( ) can involve making a function call to FUNC2( ) or it can hit a RETURN statement. If FUNC1( ) encounters a RETURN statement (or an EXIT statement), then execution in the RCF engine can terminate and execution of the routing policy can transfer back to the point of application where execution of the routing policy can continue with policy directive 414b which follows policy directive 414a.

If FUNC1 ( ) encounters a call to FUNC2( ), then the RCF engine can continue execution within FUNC2( ). Execution of FUNC2( ) in turn can include making a function call to FUNC3( ) or it can hit a RETURN statement or it can hit an EXIT statement. If FUNC2( ) encounters a RETURN statement, then the RCF engine can transfer execution back to the calling function, namely FUNC1( ), and execution continues in FUNC1( ), where upon termination of FUNC1( ) execution of the routing policy can continue with policy directive 414b. On the other hand, if FUNC2( ) encounters an EXIT statement, then the RCF engine can terminate, which terminates execution of FUNC2( ). Execution of the routing policy can immediately transfer back to the point of application 412 and continue with policy directive 414b. The transfer is "immediate" in the sense that program execution does not return to the point of application via FUNC1( ); policy function FUNC1( ) is bypassed altogether.

If FUNC2( ) encounters a call to FUNC3( ), then the RCF engine can continue execution within FUNC3( ). FUNC3( ) in turn can hit a RETURN statement or it can hit an EXIT statement. If FUNC3( ) encounters a RETURN statement, then the RCF engine can transfer execution back to the calling function, namely FUNC2( ), and execution continues in FUNC2( ). If in FUNC2( ), we hit the RETURN statement, then execution transfers to the calling function of FUNC2( ), namely FUNC1( ) where, upon termination of FUNC1( ), execution of the routing policy can continue with policy directive 414b. As can be seen in FIG. 4, this scenario illustrates the typical "unwinding" for nested function calls using a conventional RETURN statement back to the point of application 412 in the routing policy to continue execution of the routing policy with policy directive 414b.

If on the other hand, FUNC3( ) encounters an EXIT statement, then the RCF engine can terminate, terminating execution of FUNC3( ). Execution of the routing policy can transfer back immediately to the point of application 412 and continue with policy directive 414b. As can be seen in FIG. 4, this scenario illustrates a direct jump back to the point of application 412 in the routing policy, bypassing the intermediate calling functions FUNC2( ) and FUNC1( ).

Figure 5:
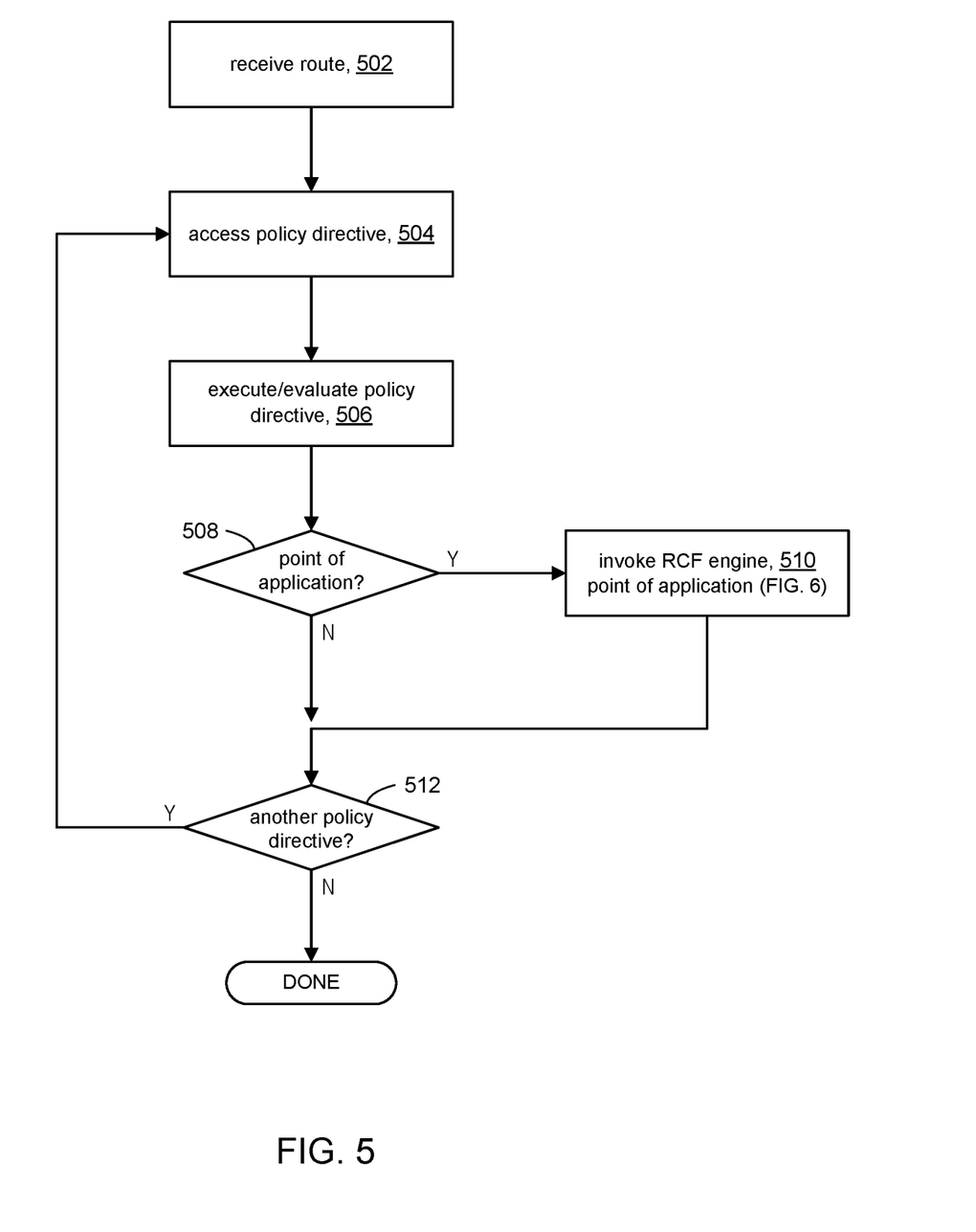
FIG. 5 represents operations for processing a policy configuration in accordance with the present disclosure.

Referring to FIG. 5, the discussion will now turn to a high-level description of processing in a network device (e.g., 100, FIG. 1) in accordance with the present disclosure for processing routes according to a routing policy, for example, by way of a policy engine (e.g., 202) executing on the network device. In some embodiments, for example, the network device can include one or more digital processing units, which when operated, can cause the network device to perform processing in accordance with FIG. 5. Digital processing units can include general CPUs in the control plane of the network device that operate by way of executing computer program code stored on a non-volatile computer readable storage medium (e.g., read-only memory); for example, CPU 108 in the control plane (FIG. 1) can be a general CPU.

Digital processing units can include specialized processors in the data plane of the network device, such as digital signal processors, field programmable gate arrays, application specific integrated circuits, and the like, that operate by way of executing computer program code or by way of logic circuits being configured for specific operations. For example, packet processors 112a-112p in the data plane (FIG. 1) can be a specialized processor. The operation and processing blocks described below are not necessarily executed in the order shown. Operations can be combined or broken out into smaller operations in various embodiments.

At operation 502, the policy engine (e.g., 214) executing on the network device can receive a route to be processed. The route can originate from a protocol agent (e.g., 204), a user (e.g., 22), etc.

At operation 504, the policy engine can access a policy directive (e.g., 414) from a routing policy (e.g., 404).

At operation 506, the policy engine can execute or otherwise evaluate the policy directive.

At decision point 508, if the policy directive includes a point of application (e.g., 412), then processing can proceed to operation 510. If the policy directive does not include a point of application, then processing can proceed to decision point 512.

At operation 510, the policy engine can transfer execution to the policy function (e.g., FUNC1( ), FIG. 4) referenced at the point of application. In some embodiments, for example, the policy engine can invoke an RCF engine (e.g., 214a) to create an execution environment within which to begin executing the policy function referenced at the point of application. Upon completion/termination of the RCF engine, processing can continue to decision point 512.

At decision point 512, if there is another policy directive in the routing policy, then processing can proceed to operation 504. Otherwise, processing of the route received at operation 502 can be deemed complete.

Figure 6:
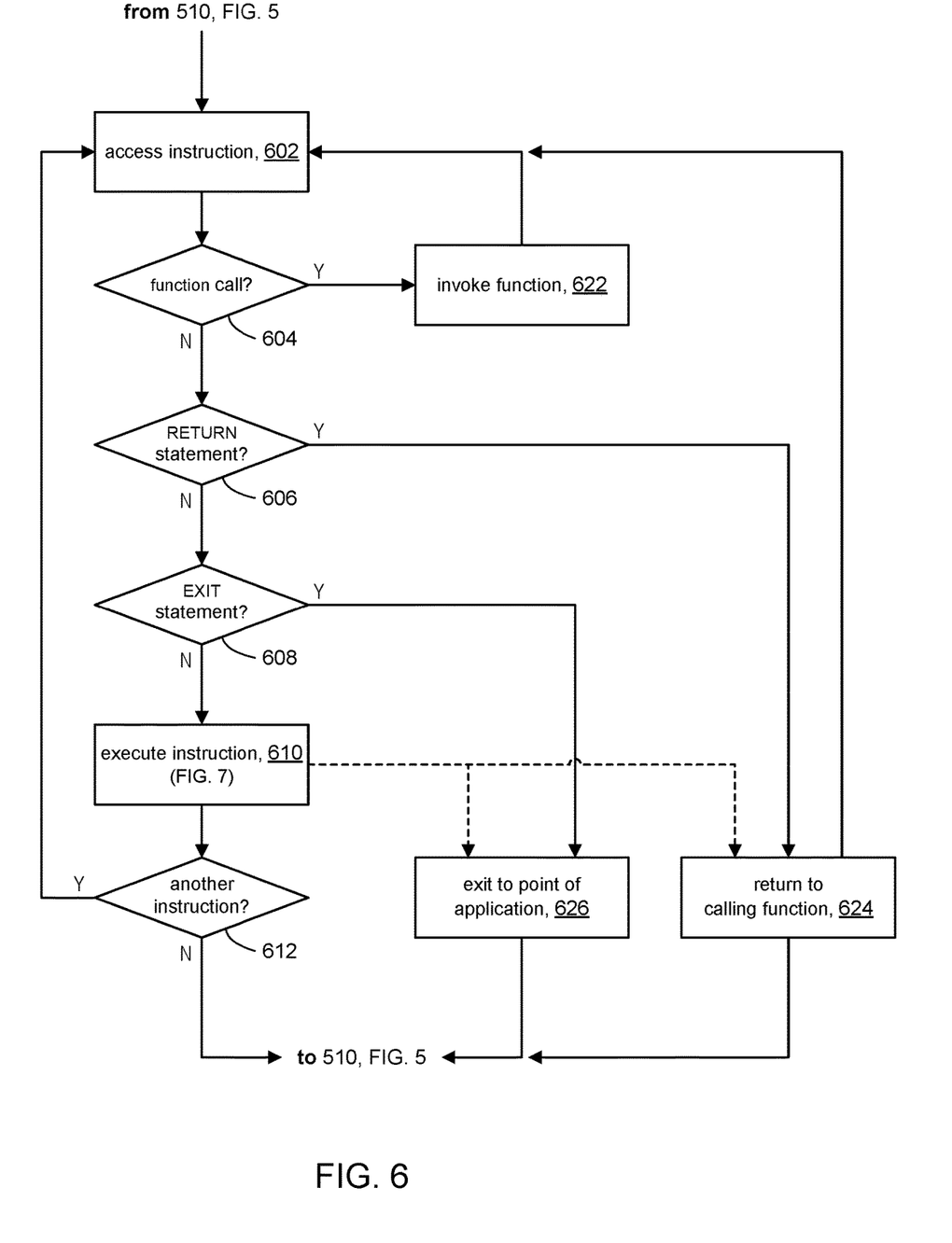
FIG. 6 represents operations for processing an EXIT statement in accordance with the present disclosure.

Referring to FIG. 6, the discussion will now turn to a high-level description of processing in a network device (e.g., 100, FIG. 1) in accordance with the present disclosure for executing policy functions, for example, by way of an RCF engine (e.g., 214a) executing in the address space (e.g., 402) of a policy engine. In some embodiments, for example, the network device can include one or more digital processing units, which when operated, can cause the network device to perform processing in accordance with FIG. 6. Digital processing units can include general CPUs in the control plane of the network device that operate by way of executing computer program code stored on a non-volatile computer readable storage medium (e.g., read-only memory); for example, CPU 108 in the control plane (FIG. 1) can be a general CPU.

Digital processing units can include specialized processors in the data plane of the network device, such as digital signal processors, field programmable gate arrays, application specific integrated circuits, and the like, that operate by way of executing computer program code or by way of logic circuits being configured for specific operations. For example, packet processors 112a-112p in the data plane (FIG. 1) can be a specialized processor. The operation and processing blocks described below are not necessarily executed in the order shown. Operations can be combined or broken out into smaller operations in various embodiments.

At operation 602, the RCF engine can access an instruction in the policy function. In the case where the policy function is invoked at the point of application (e.g., 412) in the routing policy, the RCF engine can access the first instruction in the policy function (e.g., FUNC1( ), FIG. 4) specified at the point of application. In the case of a function call (operation 622), the RCF engine can access the first instruction in the called function. In the case of a return from a called function (operation 624), the RCF engine can access the instruction in the calling function that follows the invocation of the called function. Otherwise, the RCF engine can access the next instruction in the policy function.

At operation 604, if the instruction is a function call, then processing can continue at operation 622. If the instruction is not a function call, then processing can continue to decision point 606.

At decision point 606, if the instruction is a RETURN statement, then processing can continue at operation 624. If the instruction is not a RETURN statement, then processing can continue to decision point 608.

At decision point 608, if the instruction is an EXIT statement, then processing can continue at operation 626. If the instruction is not an EXIT statement, then processing can continue at operation 610.

At operation 610, the RCF engine can execute the instruction. The instruction may be an expression that includes a RETURN statement and/or an EXIT statement. If the instruction is an expression and if evaluation of that expression (e.g., per FIG. 7) results in a RETURN or an EXIT, then processing can continue at operation 624 (RETURN) or operation 626 (EXIT). Otherwise, upon completing execution of the instruction, processing can continue at decision point 612.

At decision point 612, if there is another instruction in the policy function, the RCF engine can proceed to operation 602 to access the next instruction. Otherwise, the RCF engine can terminate. Execution of the routing policy can transfer back to the point of application to continue with execution of policy directives following the point of application (operation 510, FIG. 5).

At operation 622, the RCF engine can invoke the called function. Processing can continue at operation 604 to access the first instruction in the called function.

At operation 624, the RCF engine can process a RETURN statement. If we are in a called function, then processing can continue at operation 602 to access the instruction in the calling function that follows invocation of the called function. If the RETURN statement is associated with a return value, then the return value becomes available to the calling function. If we are in the function that was invoked at the point of application (e.g., FUNC1( ) in FIG. 4), then the RCF engine can terminate to resume execution of the routing policy from the point of application (operation 510, FIG. 5). If the RETURN statement is associated with a return value, then the return value becomes available at the point of application.

At operation 626, the RCF engine can process an EXIT statement. In accordance with the present disclosure, the RCF engine can terminate and execution of the routing policy can immediately resume from the point of application (operation 510, FIG. 5) without returning execution to a calling function. The immediate return to the point of application occurs irrespective of how deeply nested the invocation hierarchy is. Referring to FIG. 4, for example, using a convention where FUNC1( ) is at level zero in the invocation hierarchy, then FUNC3( ) represents a function call that is nested two levels deep in the invocation hierarchy. In some embodiments, the EXIT statement can be associated with a return value; e.g., TRUE, FALSE, UNKNOWN. In accordance with the present disclosure, this return value can be made available to the policy engine at the point of application, for example, to inform further processing of the routing policy.

Figure 7:
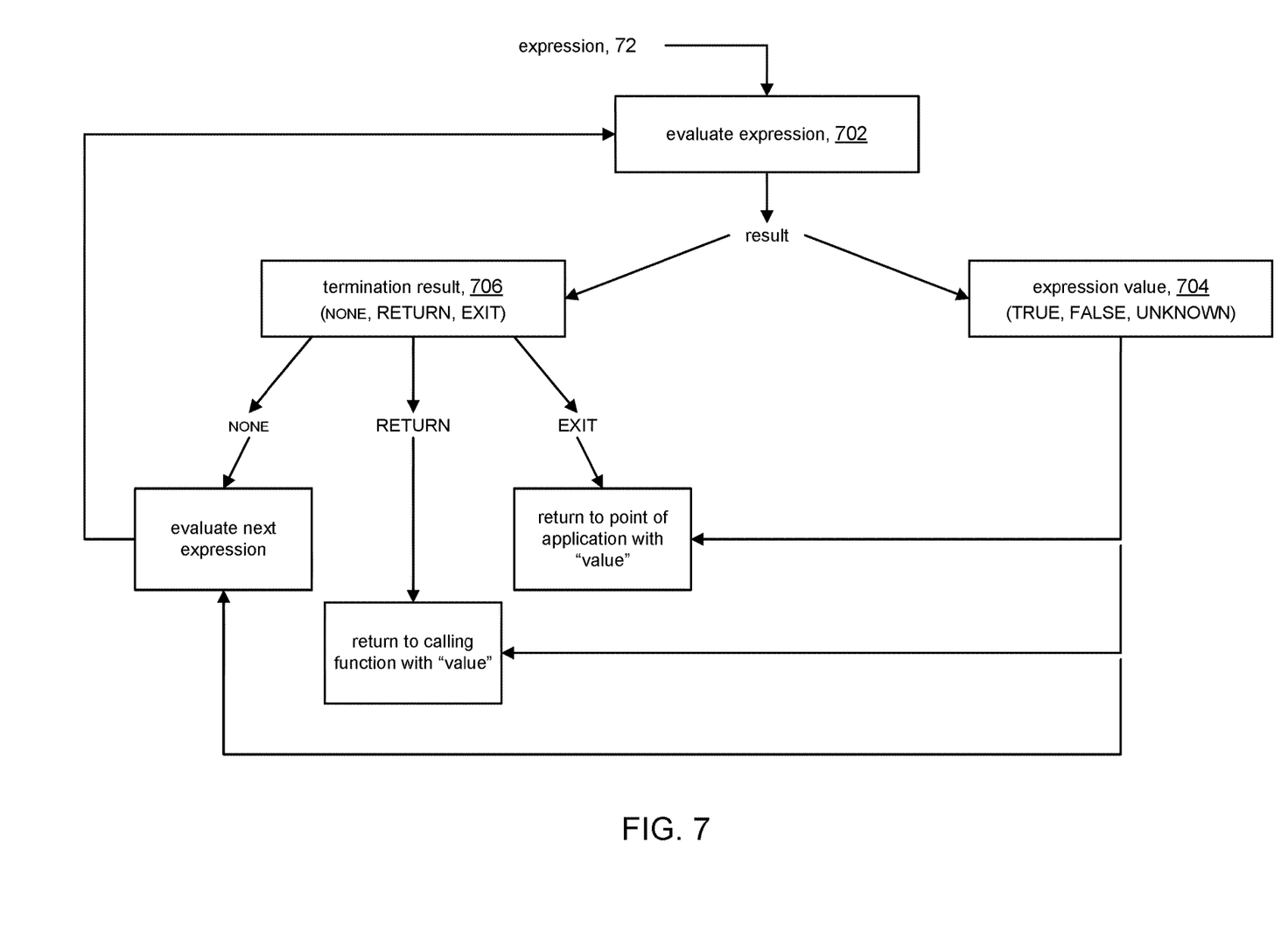
FIG. 7 illustrates expression evaluation in accordance with some embodiments.

FIG. 7 illustrates how expressions can be evaluated in accordance with the present disclosure. Evaluation of an expression 72 can begin at 702. The evaluation can produce a "result" comprising an expression value component (704) and a termination result (706). If the termination result is "NONE", then evaluation of the expression can continue at 702. If the termination result is RETURN, then program control can return to the calling function. If the termination result is EXIT, then program control returns to the above-described point of application.

Consider, for example, the expression:

$$\text{EXIT}(A==100 \text{ or } B==200);$$

When the sub-expression "A==100" is evaluated, the "expression value" will be true, false, or unknown, depending on the value of "A". The "termination result" will be "NONE" because the sub-expression "A==100" is neither a RETURN or an EXIT statement, and the expression continues to be evaluated. The next expression to be evaluated is "B==200". When the sub-expression "B==200" is evaluated, the resulting expression value replaces the previously produced expression value. The termination result will again be "NONE" because the sub-expression is neither the RETURN or EXIT statement, and the expression continues to be evaluated. When the EXIT statement is encountered, the expression value (the value that is provided to the point of application) is the result of the OR statement, which will be TRUE or FALSE depending on the values of A and B. The termination result will be "EXIT" because of the EXIT statement. This will cause program control to return to the point of application; the expression value is provided to the routing policy at the point of application.

FURTHER EXAMPLES

Features described above as well as those claimed below may be combined in various ways without departing from the scope hereof. The following examples illustrate some possible, non-limiting combinations:

(A1) A method for evaluating a routing policy in a network device. The method comprises executing policy directives in the routing policy; invoking a first function at a point of application in a policy directive in the routing policy, wherein the routing policy includes an invocation of the first function at the point of application, wherein program execution transfers from executing the policy directives to executing program instructions in the first function. The method further comprises the first function invoking a second function at a point of invocation in the first function, wherein the first function includes a function call to the second function at the point of invocation, wherein program execution transfers from executing program instructions in the first function to executing program instructions in the second function. The method further comprises, in response to executing a program control flow statement of a first kind in the second function, transferring program execution from executing program instructions in the second function to executing policy directives in the routing policy that follow the point of application without executing program instructions in the first function that follow the point of invocation.

(A2) The method denoted as (A1) further comprising, in response to executing a program control flow statement of a second kind in the second function, transferring program execution from executing program instructions in the second function to executing program instructions that follow the point of invocation in the first function.

(A3) The method denoted as any of (A1) through (A2) further comprising transferring program execution from executing program instructions in the first function to executing policy directives in the routing policy that follow the point of application in response to completing execution of the first function.

(A4) For the method denoted as any of (A1) through (A3), wherein transferring program execution from the second function to the first function includes making available to the first function a return value associated with the program control flow statement of the second kind.

(A5) For the method denoted as any of (A1) through (A4), wherein transferring program execution from the second function to policy directives in the routing policy includes making available to the routing policy a return value associated with the program control flow statement of the first kind.

(A6) The method denoted as any of (A1) through (A5) further comprising instantiating an address space within which to execute the policy directives of the routing policy, wherein the first function and the second function execute in the address space.

(A7) The method denoted as any of (A1) through (A6) further comprising: the second function invoking a third function, wherein program execution transfers to program instructions in the third function; and in response to executing a program control flow statement of the first kind in the third function, transferring program execution from executing program instructions in the third function to executing policy directives in the routing policy that follow the point of application without executing program instructions in the second function or executing program instructions in the first function.

(A8) The method denoted as any of (A1) through (A7) further comprising: invoking an i-th function that is n invocation levels deep; and in response to executing a program control statement of the first kind in the i-th function, transferring program execution from executing program instructions in the i-th function to executing policy directives in the routing policy that follow the point of application without executing program instructions in any of the invoked functions.

(B1) A method in a network device for evaluating a routing policy, the method comprising: a policy directive invoking a first child function at a point of application in the routing policy, wherein program execution transfers to program instructions in the first child function; the first child function invoking a second child function in the first child function, wherein program execution transfers to program instructions in the second child function; and in response to executing a program control flow statement of a first kind in the second child function, bypassing program instructions in the first child function to transfer program execution from the second child function to a location in the routing policy that follows the point of application without executing program instructions in the first child function.

(B2) The method denoted as (B1) further comprising, in response to executing a program control flow statement of a second kind in the second child function, transferring program execution from the second child function to program instructions following invocation of the second child function in the first child function.

(B3) For the method denoted as any of (B1) through (B2), wherein transferring program execution from the second child function to the first child function includes making available to the first child function a return value associated with the program control flow statement of the second kind.

(B4) For the method denoted as any of (B1) through (B3), wherein transferring program execution from the second child function to the routing policy includes making available to the policy directive a return value associated with the program control flow statement of the first kind.

(B5) For the method denoted as any of (B1) through (B4), wherein the first child function and the second child function execute in an address space of the policy directive.

(B6) The method denoted as any of (B1) through (B5) further comprising: the second child function invoking a third child function, wherein program execution transfers to program instructions in the third child function; and in response to executing a program control flow statement of the first kind in the third child function, bypassing program instructions in the second child function and program instructions in the first child function to transfer program execution from the third child function to the location in the routing policy that follows the point of application without executing program instructions in the second and first child functions.

(C1) A network device comprising: one or more computer processors; and a computer-readable storage medium comprising instructions for controlling the one or more computer processors to execute a routing policy, wherein the instructions control the one or more computer processors to: transfer execution of the routing policy from executing a first policy directive in the routing policy to executing to executing program instructions in a first function specified in the first policy directive, wherein the first function includes a function call to a second function; transfer execution of the routing policy from executing program instructions in the first function to executing program instructions in the second function in response to encountering the function call, wherein the second function includes an EXIT statement; and transfer execution of the routing policy from executing program instructions in the second function to executing a second policy directive in the routing policy that follows the first policy directive in response to encountering the EXIT statement, without executing any program instructions in the first function.

(C2) For the network device denoted as (C1), wherein the second function includes a RETURN statement, wherein the computer-readable storage medium further comprises instructions for controlling the one or more computer processors to transfer execution of the routing policy from executing program instructions in the second function to executing program instructions in the first function in response to encountering the RETURN statement.

(C3) For the network device denoted as any of (C1) through (C2), wherein the computer-readable storage medium further comprises instructions for controlling the one or more computer processors to transfer execution of the routing policy from executing program instructions in the first function to executing the second policy directive in the routing policy that follows the first policy directive when execution of the first function is complete.

(C4) For the network device denoted as any of (C1) through (C3), wherein the EXIT statement in the second function is associated with a return value, wherein the return value is available when execution of the routing policy resumes with the second policy directive.

(C5) For the network device denoted as any of (C1) through (C4), wherein the first and second functions execute in the same address space as execution of the routing policy.

(C6) For the network device denoted as any of (C1) through (C5), wherein the computer-readable storage medium further comprises instructions for controlling the one or more computer processors to: execute program instructions in an i-th function that is n invocation levels deep and includes an EXIT statement; and in response to encountering the exit statement in the i-th function, transfer execution of the routing policy from executing program instructions in the i-th function to executing the second policy directive in the routing policy without executing any functions invoked to reach the i-th function.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for evaluating a routing policy in a network device, the method comprising:
executing policy directives in the routing policy;
invoking a first function at a point of application in a policy directive in the routing policy, wherein the routing policy includes an invocation of the first function at the point of application, wherein program execution transfers from executing the policy directives to executing program instructions in the first function;
the first function invoking a second function at a point of invocation in the first function, wherein the first function includes a function call to the second function at the point of invocation, wherein program execution transfers from executing program instructions in the first function to executing program instructions in the second function; and
in response to executing a program control flow statement of a first kind in the second function, transferring program execution from executing program instructions in the second function to executing policy directives in the routing policy that follow the point of application without executing program instructions in the first function that follow the point of invocation.

2. The method of claim 1, further comprising, in response to executing a program control flow statement of a second kind in the second function, transferring program execution from executing program instructions in the second function to executing program instructions that follow the point of invocation in the first function.

3. The method of claim 2, further comprising transferring program execution from executing program instructions in the first function to executing policy directives in the routing policy that follow the point of application in response to completing execution of the first function.

4. The method of claim 2, wherein transferring program execution from the second function to the first function includes making available to the first function a return value associated with the program control flow statement of the second kind.

5. The method of claim 1, wherein transferring program execution from the second function to policy directives in the routing policy includes making available to the routing policy a return value associated with the program control flow statement of the first kind.

6. The method of claim 1, further comprising instantiating an address space within which to execute the policy directives of the routing policy, wherein the first function and the second function execute in the address space.

7. The method of claim 1, further comprising:
the second function invoking a third function, wherein program execution transfers to program instructions in the third function; and
in response to executing a program control flow statement of the first kind in the third function, transferring program execution from executing program instructions in the third function to executing policy directives in the routing policy that follow the point of application without executing program instructions in the second function or executing program instructions in the first function.

8. The method of claim 1, further comprising:
invoking an i-th function that is n invocation levels deep; and
in response to executing a program control statement of the first kind in the i-th function, transferring program execution from executing program instructions in the i-th function to executing policy directives in the routing policy that follow the point of application without executing program instructions in any of the invoked functions.

9. A method in a network device for evaluating a routing policy, the method comprising:
a policy directive invoking a first child function at a point of application in the routing policy, wherein program execution transfers to program instructions in the first child function;
the first child function invoking a second child function in the first child function, wherein program execution transfers to program instructions in the second child function; and
in response to executing a program control flow statement of a first kind in the second child function, bypassing program instructions in the first child function to transfer program execution from the second child function to a location in the routing policy that follows the point of application without executing program instructions in the first child function.

10. The method of claim 9, further comprising, in response to executing a program control flow statement of a second kind in the second child function, transferring program execution from the second child function to program instructions following invocation of the second child function in the first child function.

11. The method of claim 10, wherein transferring program execution from the second child function to the first child function includes making available to the first child function a return value associated with the program control flow statement of the second kind.

12. The method of claim 9, wherein transferring program execution from the second child function to the routing policy includes making available to the policy directive a return value associated with the program control flow statement of the first kind.

13. The method of claim 9, wherein the first child function and the second child function execute in an address space of the policy directive.

14. The method of claim 9, further comprising:
the second child function invoking a third child function, wherein program execution transfers to program instructions in the third child function; and
in response to executing a program control flow statement of the first kind in the third child function, bypassing program instructions in the second child function and program instructions in the first child function to transfer program execution from the third child function to the location in the routing policy that follows the point of application without executing program instructions in the second and first child functions.

15. A network device comprising:
one or more computer processors; and
a computer-readable storage medium comprising instructions for controlling the one or more computer processors to execute a routing policy, wherein the instructions control the one or more computer processors to:
transfer execution of the routing policy from executing a first policy directive in the routing policy to executing to executing program instructions in a first function specified in the first policy directive, wherein the first function includes a function call to a second function;
transfer execution of the routing policy from executing program instructions in the first function to executing program instructions in the second function in response to encountering the function call, wherein the second function includes an EXIT statement; and
transfer execution of the routing policy from executing program instructions in the second function to executing a second policy directive in the routing policy that follows the first policy directive in response to encountering the EXIT statement, without executing any program instructions in the first function.

16. The network device of claim 15, wherein the second function includes a RETURN statement, wherein the computer-readable storage medium further comprises instructions for controlling the one or more computer processors to transfer execution of the routing policy from executing program instructions in the second function to executing program instructions in the first function in response to encountering the RETURN statement.

17. The network device of claim 16, wherein the computer-readable storage medium further comprises instructions for controlling the one or more computer processors to transfer execution of the routing policy from executing program instructions in the first function to executing the second policy directive in the routing policy that follows the first policy directive when execution of the first function is complete.

18. The network device of claim 15, wherein the EXIT statement in the second function is associated with a return value, wherein the return value is available when execution of the routing policy resumes with the second policy directive.

19. The network device of claim 15, wherein the first and second functions execute in the same address space as execution of the routing policy.

20. The network device of claim 15, wherein the computer-readable storage medium further comprises instructions for controlling the one or more computer processors to:
- execute program instructions in an i-th function that is n invocation levels deep and includes an EXIT statement; and
- in response to encountering the exit statement in the i-th function, transfer execution of the routing policy from executing program instructions in the i-th function to executing the second policy directive in the routing policy without executing any functions invoked to reach the i-th function.

* * * * *